US012662021B2

(12) United States Patent

Martin et al.

(10) Patent No.: US 12,662,021 B2

(45) Date of Patent: Jun. 23, 2026

(54) COOLING SYSTEM FOR AIRCRAFT

(71) Applicants: Airbus SAS, Blagnac (FR); Airbus Operations SAS, Toulouse (FR)

(72) Inventors: Charles-Etienne Martin, Toulouse (FR); Frederick Berg, Taufkirchen (DE); Darren Paget, Toulouse (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 116 days.

(21) Appl. No.: 18/676,115

(22) Filed: May 28, 2024

(65) Prior Publication Data

US 2024/0399931 A1     Dec. 5, 2024

(30) Foreign Application Priority Data

May 30, 2023     (FR) ...................................... 2305355

(51) Int. Cl.
| | |
|---|---|
| *B60L 58/33* | (2019.01) |
| *B64D 41/00* | (2006.01) |
| *H01M 8/04007* | (2016.01) |
| *H01M 8/04082* | (2016.01) |
| *H01M 8/0438* | (2016.01) |
| *H01M 8/04701* | (2016.01) |
| *H01M 8/04746* | (2016.01) |

(52) U.S. Cl.
CPC ............. *B60L 58/33* (2019.02); *B64D 41/00* (2013.01); *H01M 8/04059* (2013.01); *H01M 8/04208* (2013.01); *H01M 8/04417* (2013.01); *H01M 8/04723* (2013.01); *H01M 8/04768* (2013.01); *B60L 2200/10* (2013.01); *B64D 2041/005* (2013.01); *H01M 2250/20* (2013.01)

(58) Field of Classification Search
CPC ................ B60L 58/32; B60L 2200/10; H01M 8/04059; H01M 8/04208; H01M 8/04358
See application file for complete search history.

(56) References Cited

U.S. PATENT DOCUMENTS

| | | | | |
|---|---|---|---|---|
| 11,296,335 | B2 * | 4/2022 | Lee | ................... H01M 8/04029 |
| 12,427,893 | B2 * | 9/2025 | Yu | ........................... B60L 58/34 |
| 2003/0217559 | A1 * | 11/2003 | Ieda | ................... H01M 8/04604 |
| | | | | 62/230 |

(Continued)

FOREIGN PATENT DOCUMENTS

| | | |
|---|---|---|
| CN | 113611894 A | 11/2021 |
| JP | 2022120893 A | 8/2022 |

OTHER PUBLICATIONS

French Search Report for corresponding French Patent Application No. 2305355 dated Mar. 19, 2024.

*Primary Examiner* — Nelson J Nieves

(74) *Attorney, Agent, or Firm* — Greer, Burns & Crain, Ltd.

(57) ABSTRACT

A cooling system for aircraft comprises a first loop intended to cool fuel cells and on which there is a ram air heat exchanger, and a second loop intended to cool power electronic equipment items and to supply heat to an evaporator to gasify dihydrogen in order to supply the fuel cells. The first loop and the second loop are interconnected by a flow line starting at the output of the ram air heat exchanger and by a return line. A controller regulates the coolant temperature in the first loop, and in the second loop by controlling the opening of the flow line. Also an aircraft with such a cooling system.

7 Claims, 4 Drawing Sheets

(56) References Cited

U.S. PATENT DOCUMENTS

| | | | |
|---|---|---|---|
| 2005/0178523 A1* | 8/2005 | Itoh | B60H 1/00385 |
| | | | 165/42 |
| 2006/0099469 A1* | 5/2006 | Meltser | H01M 8/04268 |
| | | | 429/444 |
| 2006/0172164 A1* | 8/2006 | Kudo | H01M 8/04358 |
| | | | 429/432 |
| 2006/0222919 A1* | 10/2006 | Tanaka | H01M 8/04022 |
| | | | 429/414 |
| 2007/0065694 A1* | 3/2007 | Maier | H01M 8/04037 |
| | | | 429/430 |
| 2008/0152976 A1* | 6/2008 | Uehara | H01M 8/04059 |
| | | | 429/454 |
| 2009/0130513 A1* | 5/2009 | Tsuchiya | B60K 1/04 |
| | | | 429/412 |
| 2011/0177416 A1* | 7/2011 | Suematsu | H01M 8/04358 |
| | | | 429/440 |
| 2017/0062846 A1* | 3/2017 | Kim | H01M 8/04768 |
| 2017/0365901 A1 | 12/2017 | Hiramitsu et al. | |
| 2020/0014043 A1* | 1/2020 | Fukatsu | H01M 8/04373 |
| 2020/0185733 A1* | 6/2020 | Ryu | H01M 8/04723 |
| 2021/0135261 A1* | 5/2021 | Ikeda | H01M 8/249 |
| 2021/0336282 A1* | 10/2021 | Ahn | H01M 8/04029 |
| 2022/0032818 A1* | 2/2022 | Klewer | H01M 8/04059 |
| 2022/0190361 A1* | 6/2022 | Jeong | H01M 8/04067 |
| 2022/0416277 A1* | 12/2022 | Song | H01M 8/04358 |
| 2023/0008243 A1* | 1/2023 | Asanuma | H01M 8/04029 |
| 2023/0278399 A1* | 9/2023 | Terry | F17C 1/12 |
| | | | 62/50.2 |
| 2023/0365026 A1* | 11/2023 | Dunn | H01M 8/04358 |
| 2024/0186545 A1* | 6/2024 | Dunn | H01M 8/04738 |
| 2024/0339636 A1* | 10/2024 | Pal | H01M 8/0662 |
| 2025/0051019 A1* | 2/2025 | Schneider | B64D 29/02 |
| 2025/0289580 A1* | 9/2025 | Gajewski | B64D 33/08 |

* cited by examiner

COOLING SYSTEM FOR AIRCRAFT

CROSS-REFERENCES TO RELATED APPLICATIONS

This application claims the benefit of French Patent Application Number 2305355 filed on May 30, 2023, the entire disclosure of which is incorporated herein by way of reference.

FIELD OF THE INVENTION

The present invention relates to a cooling system for fuel cells and power electronic equipment items of an aircraft.

BACKGROUND OF THE INVENTION

A fuel cell system makes it possible to generate electricity while not issuing any poisonous emissions for the environment. Such a system of cells can supply electricity to multiple equipment items on board an aircraft, such as, for example, a lighting system, a ventilation system, or a propulsion system of the aircraft.

It is thus known practice to equip an aircraft with a propulsion system comprising at least one fuel cell used to power an electric motor and a propeller. Such a propulsion system generally comprises a plurality of fuel cells.

A liquid cooling system is used in order to regulate the temperature of the fuel cells. The cooling system typically comprises an evaporator. Indeed, for the operation of said at least one fuel cell in order to produce energy, hydrogen (dihydrogen, H2) is supplied in gaseous form, while it is stored in liquid form in a tank. The evaporator is used to gasify the hydrogen in liquid form to supply the fuel cells. To do this, the evaporator uses the residual heat of the cooling system.

Similarly, a liquid cooling system is used in order to regulate the temperature of power electronic equipment items of the propulsion system, such as, for example, DC-DC (direct current) converters, of the control units or of the electric motor. The evaporator can then use the residual heat of the cooling system intended for the power electronic equipment items.

One difficulty in designing liquid cooling systems is that the heat withdrawn by the evaporator and the heat originating from the power electronic equipment items are not always balanced. This leads to a heat balance which can switch over between a need for warming up (at high power) the coolant and for cooling (at low power) the coolant to regulate the temperature of the power electronic equipment items.

It is therefore desirable to provide a solution which makes it possible to regulate the temperature of the coolant for the operation of the fuel cells, and the temperature of the coolant for the operation of the power electronic equipment items, while having a limited impact on the drag of the aircraft.

SUMMARY OF THE INVENTION

Thus, a cooling system is proposed here that is intended to be used in an aircraft which comprises at least one fuel cell, an evaporator and power electronic equipment items, the cooling system comprising a cooling circuit in which a coolant circulates, the cooling circuit comprising:

a first loop intended to cool said at least one fuel cell and on which there is a ram air heat exchanger, called primary, and a first temperature sensor;

a second loop intended to cool said at least one power electronic equipment item and to supply heat to the evaporator to gasify dihydrogen in order to supply said at least one fuel cell, a second temperature sensor being present on the second loop;

a controller configured to adjust the opening of a first valve at the input of the primary ram air heat exchanger and a second valve on a recirculation branch of the first loop, so as to regulate the temperature of a coolant at the input of said at least one fuel cell.

The cooling circuit is such that the first loop and the second loop are interconnected by a flow line and by a return line, the flow line starting at the output of the primary ram air heat exchanger and being controlled in opening by the controller, so as to regulate the temperature of the coolant at the input of said at least one power electronic equipment item.

The controller is configured to regulate said temperatures of the coolant according to temperature measurements performed by the first temperature sensor and by the second temperature sensor.

Thus, by virtue of the interconnection of the first loop and of the second loop, and of the configuration of the controller, the temperature of the coolant for the operation of the power electronic equipment items is regulated by withdrawing coolant from the first loop to inject it into the second loop, which has a limited impact on the drag of the aircraft.

According to a particular embodiment, another ram air heat exchanger, called secondary, is present on the first loop in parallel with the primary ram air heat exchanger.

According to a particular embodiment, the return line emerges in a regulation duct connecting to the first loop a regulator tank adapted to regulate the pressure of the coolant at the input of said at least one fuel cell.

According to a particular embodiment, the controller implements the following modes:

a warming-up mode, in which the temperature of the coolant expected at the output of the primary ram air heat exchanger is of the same order of magnitude as a first target temperature suited to the operation of said at least one fuel cell; and a cooling mode, in which the temperature of the coolant expected at the output of the primary ram air heat exchanger is less than a second target temperature suited to the operation of said at least one power electronic equipment item, the second target temperature being less than the first target temperature.

According to a particular embodiment, the first loop and the second loop are interconnected also by a complementary flow line starting at the output of said at least one fuel cell, and controlled in opening by said controller.

According to a particular embodiment, the complementary flow line emerges in the flow line using a three-way valve that is controlled in opening by the controller in order to regulate the temperature of the coolant at the input of said at least one power electronic equipment item.

Also proposed is an aircraft comprising at least one fuel cell, an evaporator, of an evaporator configured to gasify dihydrogen in order to supply said at least one fuel cell, and power electronic equipment items, and at least one cooling system as mentioned above in any one of its embodiments.

BRIEF DESCRIPTION OF THE DRAWINGS

The features of the invention mentioned above, and others, will become more clearly apparent on reading the following description of at least one exemplary embodiment, said description being given in relation to the attached drawings, in which.

DETAILED DESCRIPTION OF THE PREFERRED EMBODIMENTS

Figure 1A:
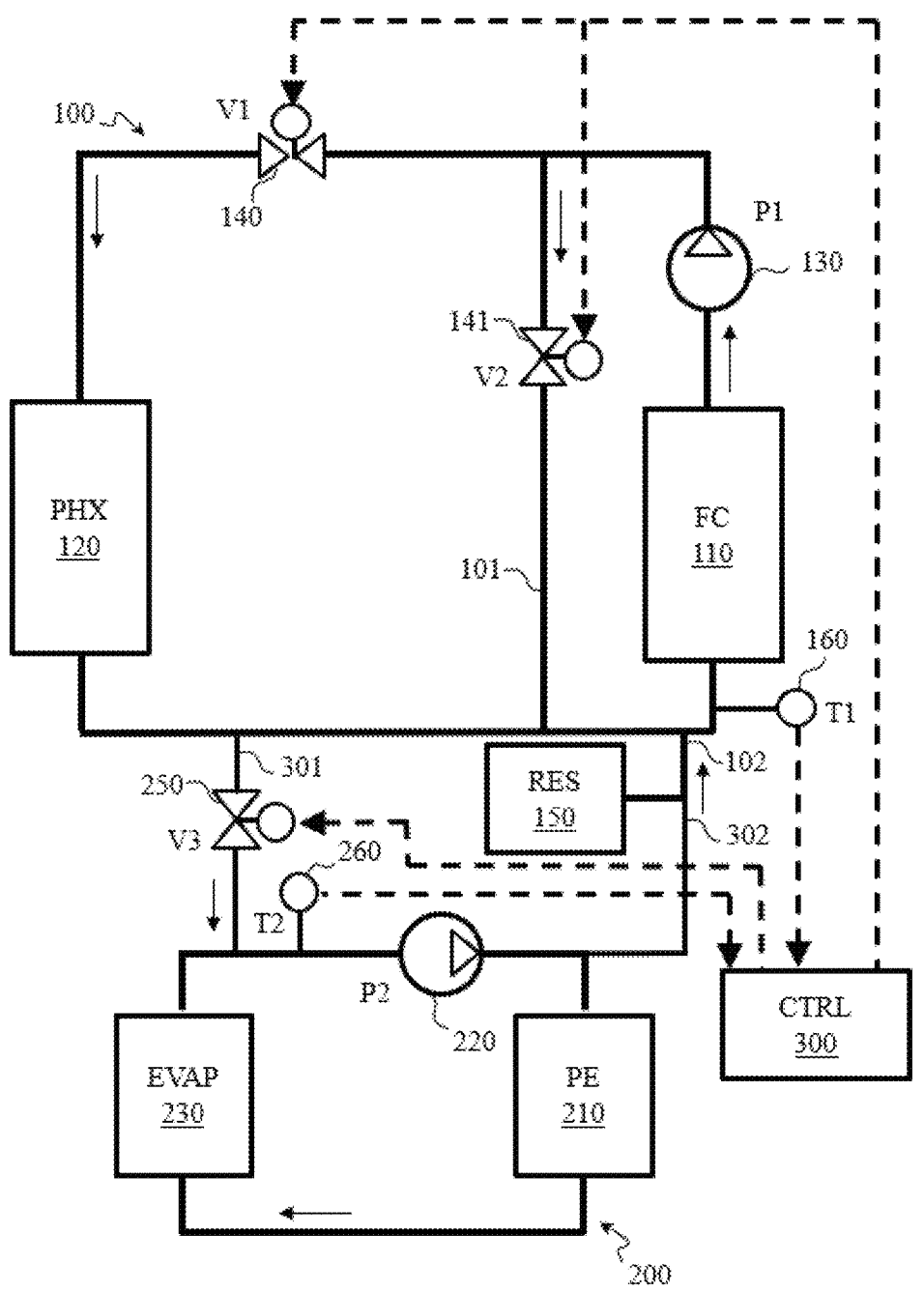
FIG. 1A schematically illustrates a cooling system intended to be used in an aircraft, according to a first embodiment.

FIG. 1A schematically illustrates a cooling system, intended to be used in an aircraft, according to a first embodiment. In FIG. 1A, arrows indicate the direction of circulation of a coolant in a circuit of the cooling system.

The cooling circuit comprises a first loop 100 intended for the cooling of at least one fuel cell FC 110. The first loop 100 comprises at least one pump P1 130 in order to ensure a circulation of the coolant in the first loop 100. In a particular embodiment, said at least one pump P1 130 is present downstream of said at least one fuel cell FC 110 relative to the direction of circulation of the coolant in the first loop 100. For example, the cooling system comprises a pump P1 130 per fuel cell FC 110. For example, said at least one pump P1 130 ensures the circulation of the coolant in the first loop 100 at a mass flow rate of 30 kg·s$^{-1}$.

The first loop 100 further comprises a primary ram air heat exchanger PHX 120.

In parallel with the primary ram air heat exchanger PHX 120, the first loop comprises a recirculation branch 101, namely a line between the output of said at least one pump P1 130 and the input of said at least one fuel cell FC 110.

The output of said at least one pump P1 130 is linked to the input of the primary ram air heat exchanger PHX 120 and the supply of coolant for the primary ram air heat exchanger PHX 120 is controlled in flow rate by a controller CTRL 300, typically using a valve V1 140.

The controller CTRL 300 also controls the flow rate in the recirculation branch 101, typically using another valve V2 141.

The valves V1 140 and V2 141 are controlled in opening by the controller CTRL 300 so as to regulate the temperature of the coolant at the input of said at least one fuel cell FC 110 at a first target temperature TT1. The first target temperature TT1 is defined as a function of a temperature range from a specification of use of said at least one fuel cell FC 110, typically between 85 and 90° C. A temperature sensor T1 160 is present on the first loop 100 at the input of said at least one fuel cell FC 110 to perform measurements of temperature of the coolant and is connected to the controller CTRL 300 so as to supply the measurements concerned to the controller CTRL 300.

The first loop 100 further comprises a regulator tank RES 150, connected by a regulation duct 102, at the input of said at least one fuel cell FC 110. The regulator tank RES 150 makes it possible to compensate for the volume variations of coolant in the cooling circuit which are linked to the temperature variations of said coolant, and the regulator tank RES 150 is arranged to ensure a regulated pressure PREG at the input of said at least one fuel cell FC 110. The regulated pressure PREG is defined as a function of a pressure range of the specifications of use of said at least one fuel cell FC 110. For example, the regulation duct 102 emerges at the crossing of the recirculation branch 101 and of a return line of the coolant originating from the primary ram air heat exchanger PHX 120, at the input of said at least one fuel cell FC 110.

The cooling circuit comprises a second loop 200 intended for the cooling of at least one power electronic equipment item PE 210.

For example, said at least one fuel cell FC 110 is configured to supply energy to at least one propulsion system of the aircraft, and said at least one power electronic equipment item PE 210 is at least one power electronic equipment item of said at least one propulsion system of the aircraft.

The second loop 200 comprises a pump P2 220 in order to ensure the circulation of the coolant in the second loop 200. For example, the pump P2 220 ensures a circulation of coolant in the second loop 200 at a mass flow rate of 5 kg·s$^{-1}$. The cooling system is such that the pressure downstream of the pump P2 220 is greater than the above-mentioned regulated pressure PREG and that the pressure upstream of the pump P2 220 is less than said regulated pressure PREG. The pump P2 220 is situated upstream of said at least one power electronic equipment item PE 210.

The second loop 200 further comprises an evaporator EVAP 230. For the operation of said at least one fuel cell in order to produce energy, hydrogen (dihydrogen, H2) is supplied in gaseous form, while it is stored in liquid form in a tank. The evaporator EVAP 230 is used to gasify the hydrogen in liquid form to supply said at least one fuel cell FC 110. To do this, the evaporator EVAP 230 uses the residual heat of the cooling system, here originating from the second loop 200. That makes it possible to lower the temperature of the coolant in the second loop 200. It must however be noted that the quantity of heat taken by the evaporator EVAP 230 from the coolant of the second loop 200 depends on the power supplied by said at least one fuel cell FC 110. Indeed, the quantity of hydrogen in gaseous form injected into the fuel cells is higher in a high-power phase (for example, on take-off) than in a low-power phase, which means that the quantity of heat taken by the evaporator EVAP 230 from the coolant of the second loop 200 is greater in high-power phase than in low-power phase. That poses a difficulty in the balancing of temperature of the coolant in the second loop 200. In addition, the balancing of the temperature of the coolant in the second loop 200 is also made difficult because the quantity of heat taken by the evaporator EVAP 230 may not be sufficient in the low-power phase to regulate the temperature of the coolant in the second loop 200 at a second target temperature TT2. The second target temperature TT2 is defined as a function of a temperature range from a specification of use of the power electronic equipment items PE 210, typically approximately 60° C., to optimize the Mean Time Between Failures MTBF of the power electronic equipment items PE 210. The second target temperature TT2 is therefore less than the first target temperature TT1.

To allow this balancing of the temperature of the coolant in the second loop 200, the first loop 100 and the second loop 200 are interconnected, so as to be able to use a part of the coolant of the first loop 100 to adjust the temperature, if need be, of the coolant of the second loop 200.

Thus, a flow line 301 connects the first loop 100 to the second loop 200 so as to allow a part of the coolant to flow from the first loop 100 to the second loop 200. Fundamentally, the first loop 100 and the second loop 200 are overall independent, allowing a different management of the coolant temperatures in the first loop 100 and the second loop 200, namely a temperature suited to the cooling of said at least one fuel cell FC 110 in the first loop 100 and a temperature suited to the cooling of the power electronic equipment items PE 210 in the second loop 200. However, there is a small interconnection between these two loops which allows an effective transfer of coolant conditioned to adjust the temperature of the coolant in the second loop 200.

The flow line 301 is controlled in opening by the controller CTRL 300, typically using a valve V3 250. The flow line 301 starts at the output of the primary ram air heat exchanger PHX 120. The flow line 301 emerges in the second loop 200 upstream of the pump P2 220 relative to the direction of circulation of the coolant in the second loop 200, that is to say at a low pressure point in the second loop 200. By adjusting the flow of the coolant in the flow line 301 through the valve V3 250, the controller CTRL 300 thus balances the coolant temperature in the second loop 200 (cooling or warming up) via small quantities of coolant taken at the output of the primary ram air heat exchanger PHX 120.

The valve V3 250 is then controlled in opening by the controller CTRL 300 so as to regulate the temperature of the coolant at the input of said at least one power electronic equipment item PE 210 at the second target temperature TT2. A temperature sensor T2 260 is present on the second loop 200 between the flow line 301 and the input of said at least one power electronic equipment item PE 210 to perform coolant temperature measurements and is connected to the controller CTRL 300 so as to supply the measurements concerned to the controller CTRL 300.

To compensate for the input of coolant via the flow line 301, a return line 302 connects the second loop 200 to the first loop 100 so as to allow a part of the coolant to flow from the second loop 200 to the first loop 100.

The return line 302 starts from the second loop 200 downstream of the pump P2 220 relative to the direction of circulation of the coolant in the second loop 200, that is to say at a high pressure point in the second loop 200. The return line 302 emerges in the first loop 100 at the input of said at least one fuel cell FC 110, that is to say at a low pressure point in the first loop 100 where the pressure is regulated (PREG) by the regulator tank RES 150. Preferentially, the return line 302 emerges in the regulation duct 102 by which the regulator tank RES 150 is connected.

The pump P2 220 is arranged such that, upstream of said pump P2 220 (relative to the direction of circulation of the coolant in the second loop 200), the pressure is less than said regulated pressure PREG and, downstream of said pump P2 220, the pressure is greater than said regulated pressure PREG. That ensures the direction of circulation of the coolant between the first loop 100 and the second loop 200.

When the controller CTRL 300 detects that the temperature of the coolant in the second loop 200 passes above the second target temperature TT2 plus a predefined upper margin (for example of 5° C.), the controller CTRL 300 switches the first loop 100 over to a mode of cooling of the coolant of the second loop 200. In the cooling mode, the temperature of the coolant expected at the output of the primary ram air heat exchanger PHX 120 is less than the second target temperature TT2 (for example 50° C.). For example, the controller can, to do this, reduce the opening of the valve V1 140. Thus the quantity of coolant to be passed through the primary ram air heat exchanger PHX 120 is less, which lowers the temperature of the coolant at the output of the primary ram air heat exchanger PHX 120. The controller CTRL 300 adjusts the opening of the valve V3 250 so as to lower the temperature of the coolant in the second loop 200 to the second target temperature TT2 and to keep it below the second target temperature TT2 plus said predefined upper margin. That makes it possible to correctly regulate the temperature of the coolant in the second loop 200 in the case of a low-power phase.

When the controller CTRL 300 detects that the temperature of the coolant in the second loop 200 passes below the second target temperature TT2 minus a predefined lower margin (for example of 5° C.), the controller CTRL 300 switches the first loop 100 to a mode of warming-up of the coolant of the second loop 200. In the warming-up mode, the temperature of the coolant expected at the output of the primary ram air heat exchanger PHX 120 is of the same order of magnitude as the first target temperature TT1. In a particular embodiment, the temperature of the coolant expected at the output of the primary ram air heat exchanger PHX 120 is equal to the first target temperature TT1 (for example 85° C.). The controller CTRL 300 adjusts the opening of the valve V3 250 so as to increase the temperature of the coolant in the second loop 200 to the second target temperature TT2 and to keep it above the second target temperature TT2 minus said predefined lower margin. That makes it possible to correctly regulate the temperature of the coolant in the second loop 200 in the case of a high-pressure phase.

The application of the predefined upper margin and of the predefined lower margin allows for a phenomenon of hysteresis avoiding untimely switchovers between cooling mode and warming-up mode.

It should also be noted that the arrangement of interconnection of the first loop 100 with the second loop 200 described above, and the control performed by the controller CTRL 300, makes it possible to regulate the temperature of the coolant in the second loop 200, and consequently the operational integrity of the power electronic equipment items PE 210, even in the event of failure of the evaporator EVAP 230. The controller CTRL 300 would then set the first loop 100 in the cooling mode, and the loss of withdrawal of heat from the coolant of the second loop 200 which would be induced by the evaporator EVAP 230 would be compensated by a greater opening of the valve V3 250.

Figure 1B:
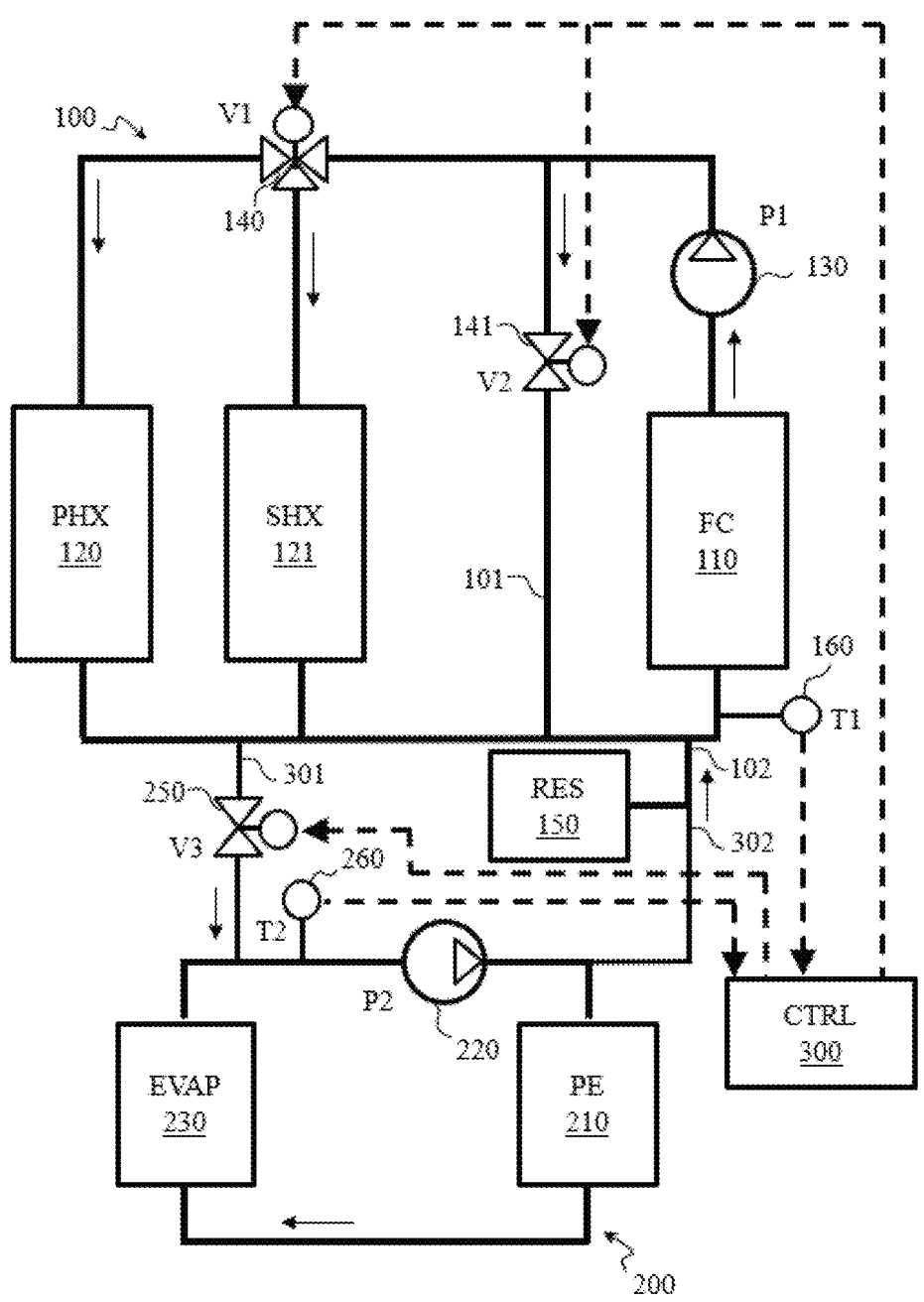
FIG. 1B schematically illustrates the cooling system, according to a second embodiment.

FIG. 1B schematically illustrates the cooling system, according to a second embodiment.

In this second embodiment, the first loop 100 further comprises a secondary ram air heat exchanger SHX 121, in parallel with the primary ram air heat exchanger PHX 120. In other words, the primary ram air heat exchanger PHX 120 and the secondary ram air heat exchanger SHX 121 are on parallel branches in the first loop 100. The valve V1 140 is then a 3-way valve, having as input, the output of said at least one pump P1 130, and, as outputs, the primary ram air heat exchanger PHX 120 and the secondary ram air heat exchanger SHX 121. Thus, the recirculation branch 101 is then in parallel with the primary ram air heat exchanger PHX 120 and the secondary ram air heat exchanger SHX 121.

In the context of FIG. 1B, the flow line 301 also starts at the output of the primary ram air heat exchanger PHX 120 (and not at the output of the secondary ram air heat exchanger SHX 121, nor of the assembly formed by the primary ram air heat exchanger PHX 120 and the secondary ram air heat exchanger SHX 121).

The arrangement of FIG. 1B with the presence of the secondary ram air heat exchanger SHX 121 allows for a distributed cooling between the primary ram air heat exchanger PHX 120 and the secondary ram air heat exchanger SHX 121 to regulate the temperature of the coolant in the first loop 100, and to impact only the operation of the primary ram air heat exchanger PHX 120 in cooling mode with a smaller quantity of coolant then injected into the primary ram air heat exchanger PHX 120. The temperature regulation in the first loop 100 is thereby facilitated, with a reduction of drag linked to the cooling by ram air using a smaller dimensioning of the primary ram air heat exchanger PHX 120.

In a variant embodiment, the 3-way valve V1 140 is replaced by a valve VIA (not represented) on the branch of the primary ram air heat exchanger PHX 120 and another valve V1B (not represented) on the branch of the secondary ram air heat exchanger SHX 121. The valves VIA and V1B are then controlled in opening by the controller CTRL 300 to adjust the coolant temperature at the output of the primary ram air heat exchanger PHX 120 for the needs of the second loop 200, and at the output of the assembly formed by the primary ram air heat exchanger PHX 120 and the secondary ram air heat exchanger SHX 121 to regulate the temperature of the coolant in the first loop 100.

Figure 2:
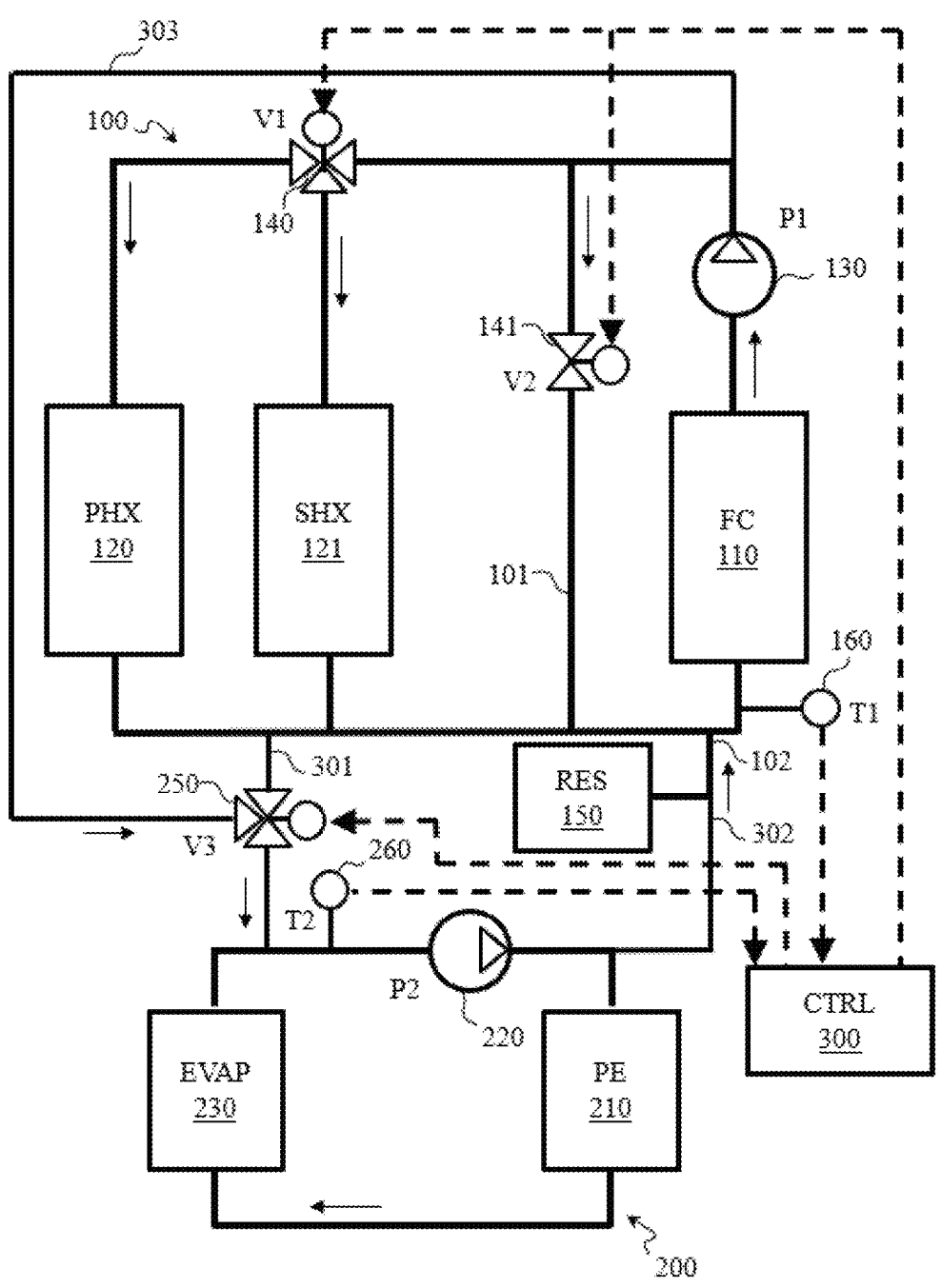
FIG. 2 schematically illustrates the cooling system, according to a third embodiment.

FIG. 2 schematically illustrates the cooling system, according to a third embodiment. FIG. 2 presents a layout of the cooling system represented in FIG. 1B. The same arrangement can be produced from FIG. 1A (i.e., without the secondary ram air heat exchanger SHX 121).

In the context of FIG. 2, the first loop 100 and the second loop 200 are interconnected also by a complementary flow line 303. The complementary flow line 303 starts at the output of said at least one fuel cell FC 110 or of said at least one pump P1 130. The complementary flow line 303 emerges in the flow line 301. The valve V3 250 is then a 3-way valve, having as inputs, the complementary flow line 303 and a part of the flow line 301 which is connected to the first loop 100, and as output, a part of the flow line 301 which is connected to the second loop 200.

This arrangement makes it possible to be able to resort, in the warming-up mode of the coolant of the second loop 200, to only having the coolant of the complementary flow line 303 flow, and to close the flow line 301. Thus the temperature regulation of the first loop 100 can be independent of that of the second loop 200 and it is not necessary to dimension the primary ram air heat exchanger PHX 120 to contribute, when necessary, to the warming-up of the coolant of the second loop 200. The induced drag is thereby improved.

In a variant embodiment, the 3-way valve V3 250 is replaced by a valve V3A (not represented) on the flow line 301 and another valve V3B (not represented) on the complementary flow line 303. The valves V3A and V3B are then controlled in opening by the controller CTRL 300 to adjust the coolant temperature for the needs of the second loop 200. The complementary flow line 303 emerges in the second loop 200 upstream of the temperature sensor T2 260, like the flow line 301, such that the coolant originating from these two lines is mixed with the coolant already present in the second loop 200 before the coolant temperature is measured by the temperature sensor T2 260.

Figure 3:
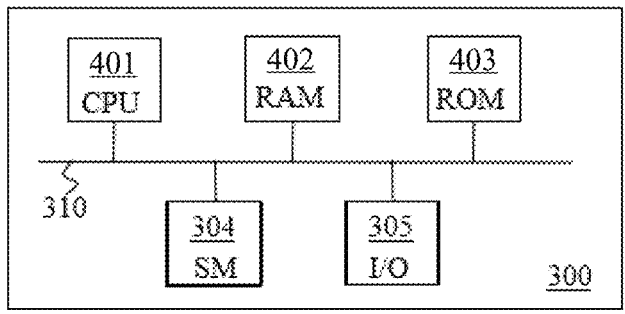
FIG. 3 schematically illustrates an example of hardware platform making it possible to implement, in electronic circuitry form, a controller of the cooling system.

FIG. 3 schematically illustrates an example of hardware platform making it possible to implement, in electronic circuitry form, the controller CTRL 300.

The hardware platform then comprises, linked by a communication bus 310: a processor or CPU (Central Processing Unit) 401; a random access memory RAM (Random-Access Memory) 402; a read-only memory 403, for example of ROM (Read Only Memory) or EEPROM (Electrically- Erasable Programmable ROM) type or of Flash type; a storage unit, such as a storage medium 304 of hard disk HDD (Hard Disk Drive) type, or a storage medium reader, such as an SD (Secure Digital) card reader; and an input/output interface manager I/O 305.

The input/output manager I/O 305 allows the controller CTRL 300 to receive temperature measurements originating from the temperature sensors T1 160 and T2 260, and possibly from other sensors, and to control the valves V1 140, V2 141 and V3 250 in order to regulate the coolant temperature in the first loop 100 and in the second loop 200. The control of opening of the valves V1 140, V2 141 and V3 250 can be performed by the controller CTRL 300 using preestablished rules and/or charts and/or Look-Up Tables LUT stored in memory.

The processor 401 is capable of executing instructions loaded into the random-access memory 402 from the read-only memory 403, from an external memory, from a storage medium (such as an SD card) or from a communication network (not represented). When the hardware platform is powered up, the processor 401 is capable of reading instructions from the random-access memory 402 and of executing them. These instructions form a computer program causing the implementation, by the processor 401, of control of the valves V1 140, V2 141 and V3 250, according to temperature measurements performed by the temperature sensors T1 160 and T2 260 in order to regulate the temperature of the coolant in the first loop 100 and in the second loop 200.

All or part of the steps and operations allowing control of the valves V1 140, V2 141 and V3 250 can thus be implemented in software form, by execution of a set of instructions by a programmable machine, for example a processor of DSP (Digital Signal Processor) type or a microcontroller, or be implemented in hardware form by a machine or a dedicated electronic component (chip) or a dedicated set of electronic components (chipset), for example an FPGA (Field Programmable Gate Array) or ASIC (Application Specific Integrated Circuit) component. Generally, the controller CTRL 300 comprises electronic circuitry adapted and configured to implement the operations and steps allowing the control of the valves V1 140, V2 141 and V3 250.

Figure 4:
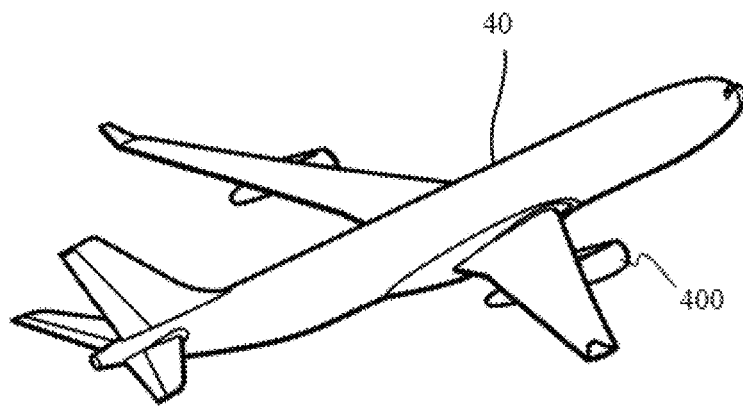
FIG. 4 schematically illustrates an aircraft.

FIG. 4 schematically illustrates an aircraft 40.

The aircraft 40 is equipped with said at least one fuel cell FC 110 and with said at least one power electronic equipment item PE 210, and the evaporator EVAP 230. The aircraft 40 is equipped with at least one cooling system as described above in any one of its embodiments.

In a particular embodiment, the aircraft 40 is equipped with propulsion systems 400 comprising at least one fuel cell used to power an electric motor and a propeller. Each propulsion system is then provided with a cooling system as described above in any one of its embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cooling system for use in an aircraft which comprises at least one fuel cell, an evaporator, and at least one power electronic equipment item, the cooling system comprising:

a cooling circuit in which a coolant circulates, the cooling circuit comprising:

a first loop configured to cool said at least one fuel cell and which comprises a primary ram air heat exchanger and a first temperature sensor;

-a second loop configured to cool said at least one power electronic equipment item and to supply heat to the evaporator to gasify dihydrogen which is passed to said at least one fuel cell, the second loop comprising a second temperature sensor; and, a controller configured to adjust an opening of a first valve at an input of the primary ram air heat exchanger and a second valve on a recirculation branch of the first loop, so as to regulate a temperature of the coolant at an input of said at least one fuel cell;

wherein the first loop and the second loop are interconnected by a flow line and by a return line, the flow line starting at an output of the primary ram air heat exchanger and flow within the flow line being controlled by the controller opening a third valve, so as to regulate a temperature of the coolant at an input of said at least one power electronic equipment item, wherein the flow line is downstream from the output of the primary ram air heat exchanger and upstream from the input of said at least one fuel cell, and, wherein the controller is further configured to regulate said temperature of the coolant at the input of said at least one fuel cell and said temperature of the coolant at an input of said at least one power electronic equipment item according to temperature measurements performed by or with the first temperature sensor and by the second temperature sensor.

2. The cooling system according to claim 1, further comprising:

a secondary ram air heat exchanger on the first loop in parallel with the primary ram air heat exchanger.

3. The cooling system according to claim 1, wherein the return line emerges in a regulation duct connecting a regulator tank to the first loop, the regulator tank configured to regulate a pressure of the coolant at the input of said at least one fuel cell.

4. The cooling system according to claim 1, wherein the controller is configured to implement the following modes:

a warming-up mode, in which a temperature of the coolant expected at the output of the primary ram air heat exchanger is of a same order of magnitude as a first target temperature suited to an operation of said at least one fuel cell; and a cooling mode, in which a temperature of the coolant expected at the output of the primary ram air heat exchanger is less than a second target temperature suited to an operation of said at least one power electronic equipment item, the second target temperature being less than the first target temperature.

5. The cooling system according to claim 1, wherein the first loop and the second loop are also interconnected by a complementary flow line starting at an output of said at least one fuel cell, and controlled by said controller opening said first valve to allow coolant circulating in the complementary flow line to flow from the first loop toward the second loop.

6. The cooling system according to claim 5, wherein the complementary flow line emerges in the flow line using a three-way valve that is controlled in opening by the controller in order to regulate the temperature of the coolant at the input of said at least one power electronic equipment item.

7. An aircraft comprising:

at least one fuel cell, an evaporator configured to gasify dihydrogen in order to supply said at least one fuel cell, at least one power electronic equipment item, and, the cooling system according to claim 1.

* * * * *